US012364884B2

(12) United States Patent
Voss et al.

(10) Patent No.: US 12,364,884 B2
(45) Date of Patent: Jul. 22, 2025

(54) FALL PROTECTION SAFETY RAIL SYSTEM

(71) Applicant: SAYFA R&D PTY LTD, Boronia (AU)

(72) Inventors: Murray Voss, Boronia (AU); Barry Voss, Boronia (AU)

(73) Assignee: SAYFA R&D PTY LTD, Boronia (AU)

( * ) Notice: Subject to any disclaimer, the term of this patent is extended or adjusted under 35 U.S.C. 154(b) by 68 days.

(21) Appl. No.: 18/001,920

(22) PCT Filed: Aug. 10, 2022

(86) PCT No.: PCT/AU2022/050871
§ 371 (c)(1),
(2) Date: Dec. 15, 2022

(87) PCT Pub. No.: WO2023/015346
PCT Pub. Date: Feb. 16, 2023

(65) Prior Publication Data

US 2024/0100373 A1 Mar. 28, 2024

(30) Foreign Application Priority Data

Aug. 13, 2021 (AU) ................................ 2021902519

(51) Int. Cl.
*A62B 35/00* (2006.01)
*E04G 21/32* (2006.01)

(52) U.S. Cl.
CPC ...... *A62B 35/0062* (2013.01); *A62B 35/0056* (2013.01); *A62B 35/0081* (2013.01); *E04G 21/3223* (2013.01); *E04G 21/3295* (2013.01)

(58) Field of Classification Search
CPC ........... A62B 35/0056; A62B 35/0062; A62B 35/0081; E04G 21/3223; E04G 21/3295
(Continued)

(56) References Cited

U.S. PATENT DOCUMENTS 5,143,170 A 9/1992 Hunt et al.
5,443,151 A 8/1995 Taylor
(Continued)

FOREIGN PATENT DOCUMENTS

AU 2018102112 B 11/2019
BR MU8502185 U 6/2007
(Continued)

OTHER PUBLICATIONS

Supplementary European Search Report dated May 13, 2024 from Application No. 228185589.8 (7 pages).
(Continued)

*Primary Examiner* — Brady W Frazier
(74) *Attorney, Agent, or Firm* — INNOVATION CAPITAL LAW GROUP, LLP; Vic Lin

(57) ABSTRACT

A fall protection safety rail system has a rail defining a trolley channel therein. The rail also defines exterior side and top attachment channels. The system has a support which engages the side attachment channels to support the rail either side thereof. One type of support may comprise a hanger channel bracket having a web and flanges spaced apart so that the flanges fit against the sides of the rail. The side and top attachment channels may be dual-purposed for connecting rail sections together using respective splices. Furthermore, the side attachment channels may overlap with the trolley channel along a vertical axis but not along a horizontal axis to confer a low profile rail configuration having enhanced resilience and capability.

28 Claims, 5 Drawing Sheets

(58) Field of Classification Search
USPC .......................................................... 182/3
See application file for complete search history.

(56) References Cited

U.S. PATENT DOCUMENTS

| | | | |
|---|---|---|---|
| 7,603,952 | B2 | 10/2009 | Vetesnik |
| 7,992,680 | B2 | 8/2011 | Small |
| 2018/0345057 | A1 | 12/2018 | Ecker et al. |

FOREIGN PATENT DOCUMENTS

| | | | |
|---|---|---|---|
| DE | 102016105378 | A1 | 9/2017 |
| FR | 2074382 | | 10/1971 |
| FR | 2921272 | A1 | 3/2009 |
| WO | 2017063762 | A1 | 4/2017 |

OTHER PUBLICATIONS

International Search Report & Written Opinion dated Nov. 14, 2022 from PCT Application No. PCT/AU2022/050871.
International type search dated Oct. 1, 2021 from Australian Application No. 2021902519.

FALL PROTECTION SAFETY RAIL SYSTEM

FIELD OF THE INVENTION

This invention relates generally to safety rail systems for applications involving high fall risk and, more particularly, to a low-profile rail and attachments therefor.

BACKGROUND

Fall arrest systems are used to prevent accidents involving falls from elevated work platforms, such as rooftops, wherein personnel are secured by a harness and lanyard to a support assembly which would prevent a fall to the ground below.

One such type of fall arrest system involves a rail along which an anchor trolley is secured. The lanyard is attached to the trolley to provide fall protection whilst allowing freedom of movement along the rail.

For example, one such rail system is U.S. Pat. No. 7,603,952 B2 (VETESNIK) 20 Oct. 2009 which discloses an apparatus having a trolley movable along a horizontally supported rail assembly for use for fall protection or other loads supporting system.

Furthermore, U.S. Pat. No. 7,992,680 B2 (SMALL) 9 Aug. 2011 discloses another type of fall protection apparatus.

SUMMARY OF THE DISCLOSURE

There is provided herein a fall protection safety rail system comprising a rail defining a trolley channel therein.

The rail also defines exterior side and top attachment channels.

The system has a support which engages the side attachment channels to support the rail either side thereof.

One type of support may comprise a hanger channel bracket having a web and flanges spaced apart so that the flanges fit against the sides of the rail.

The flanges may have slots therein collocating with the side attachment channels through which the T-shaped fasteners interlock. The side attachment channels may be located towards upper side regions of the rail so that the rail can hang substantially from beneath the hanger channel bracket.

The side attachment channels may overlap with the trolley channel along a vertical axis but not along a horizontal axis so that the rail has a low-profile configuration wherein the width may be substantially the same as the height thereof. This low-profile, generally square configuration may also experience less torsional force along a vertical axis when loaded under side force as compared to a taller rail configuration. The low-profile may also facilitate the bending of the rail, including for forming 90° sections.

Top and bottom interior surfaces of the side attachment channels may lie either side of a lower surface of the top attachment channel along the vertical axis, thereby further conferring a low-profile configuration to the rail.

The attachment channels may be dual-purposed for also connecting rail sections together using splices which slide longitudinally into respective channels.

Top and side splices are preferably used together at each interconnection in the top and side connection attachment channels respectively, thereby cooperating to confer bending resilience across both horizontal and vertical axes.

The side splices may be straight and planar and may comprise a plurality of threaded apertures therealong, through which screws tighten to fix the side splices in place.

The top splice that fits within the top attachment channel of the rail may be T-shaped in cross-section to conform with the corresponding interior cross section of the top attachment channel. The top splice may comprise step-profiled sides and a more resilient thicker mid-section therebetween and whereby the sides engage under edge flanges of the top attachment channel. Tension bolts may engage through a plurality of threaded apertures of the top splice and wherein distal ends thereof bear against an inner surface of the top attachment channel to tighten the top splice oppositely against the cross-sectional edge flanges of the top attachment channel.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
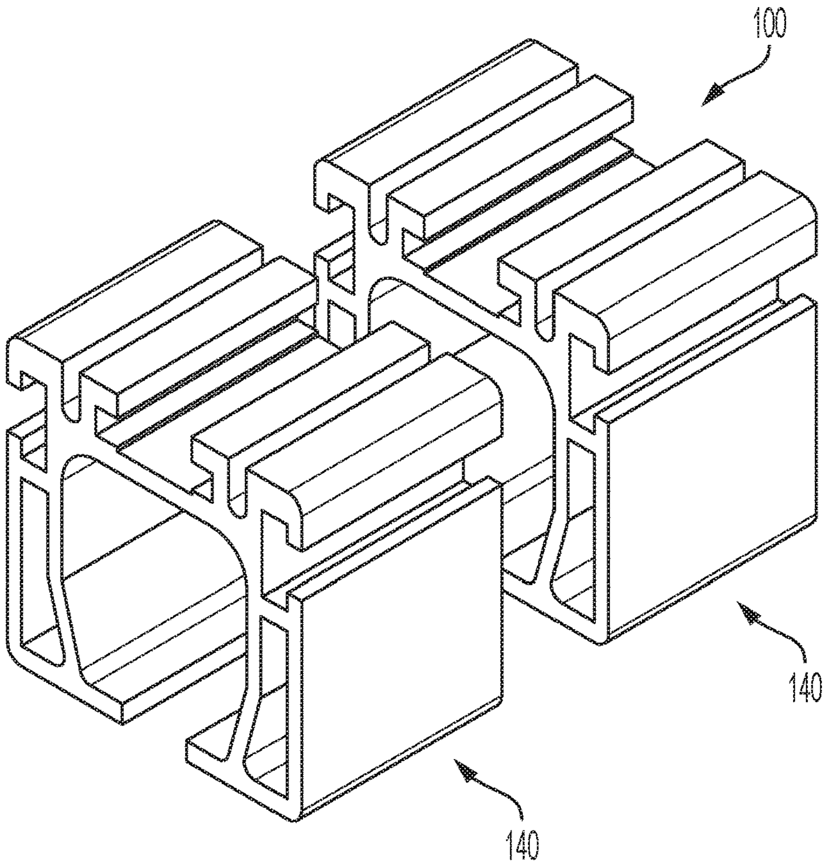
FIG. 1 shows a perspective view of sections forming a rail.
Figure 2:
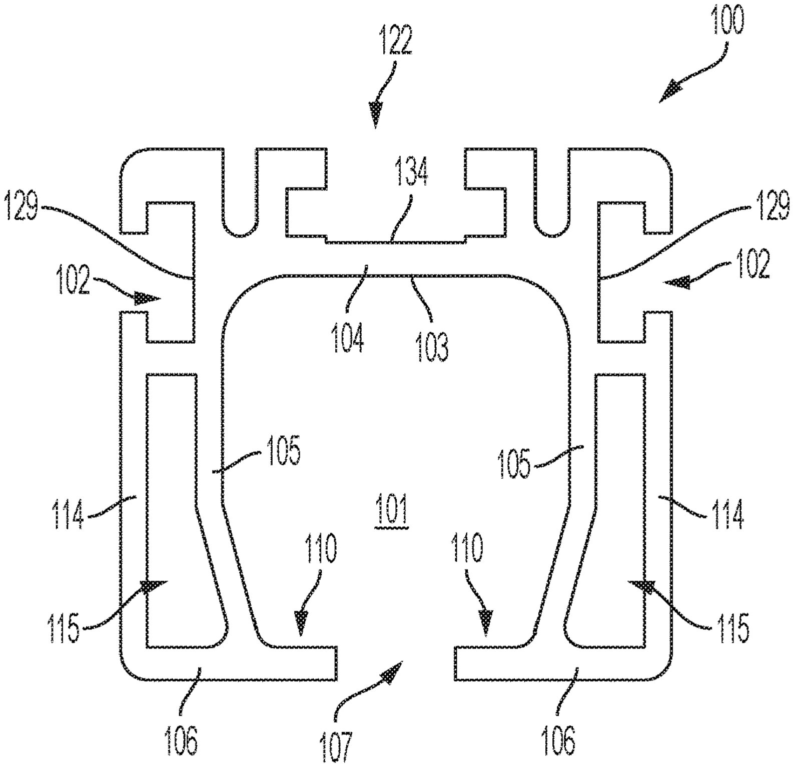
FIG. 2 shows a cross-sectional end view of the rail.

With reference to FIGS. 1 and 2, a fall protection safety rail system comprises a rail 100 defining a trolley channel 101 therein. Sections 140 of the rail 100 may be formed using an aluminium extrusion process. A person may be secured from a trolley within the rail using a safety harness and lanyard The rail 100 may form side attachment channels 102. The side attachment channels 102 may be located towards upper side regions of the rail 100.

The side attachment channels 102 may overlap with the trolley channel 101 along a vertical axis but not along a horizontal axis to thereby define a low-profile configuration wherein the width may be substantially the same as the height thereof.

It should be noted that reference to horizontal and vertical and derivatives thereof is used for explanatory convenience, given the orientation of the rail 100 illustrated in FIG. 2.

In the preferred embodiment shown in FIG. 2, upper ends of the side attachment channels 102 extend above an upper surface 103 of the trolley channel 101, whereas lower ends of the side attachment channels 102 extend beneath the upper surface 103 of the trolley channel 101. In other words, the side attachment channels 102 lie across the upper surface 103 of the trolley channel 101 along the vertical axis.

The rail 100 may comprise a trolley channel top section 104 meeting trolley channel side sections 105, with the trolley channel side sections 105 meeting a rail bottom section 106. The top section 104, side sections 105 and rail bottom section 106 form the trolley channel 101 therebetween.

Figure 3:
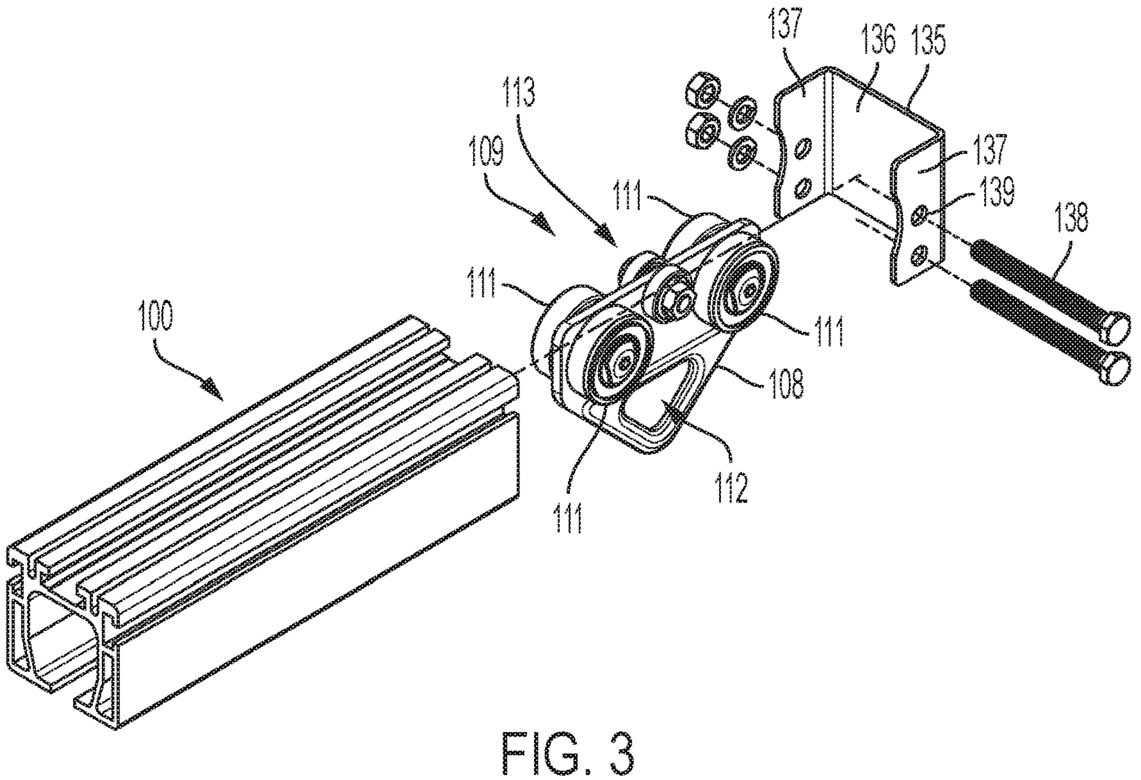
FIG. 3 shows a disassembled perspective view of a trolley which runs through the rail and FIG. 4 shows a cross-sectional end view thereof.
Figure 4:
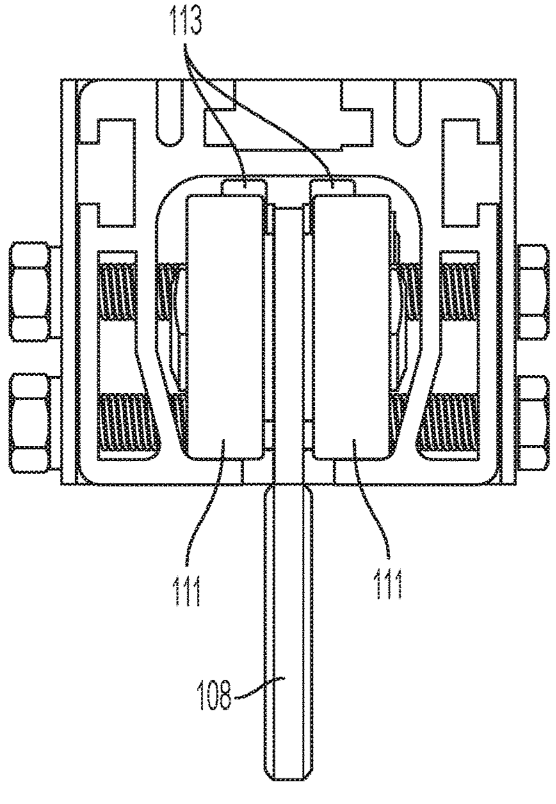

The rail bottom section 106 may allow a gap 107 therebetween for a body 108 of a trolley 109 shown in FIGS. 3 and 4 and defines bearing surfaces 110 adjacent thereto for the main roller bearings 111 of the trolley 109. As further shown in FIG. 3, an end cap 135 may terminate the rail 100. The end cap 135 may comprise a web 136 and side flanges 137. Fasteners 138 may be inserted through corresponding apertures 139 of the side flanges 137 and through corresponding apertures (not shown) of the rail 100. At the end of the rail 100, the trolley 109 is prevented by the central web 136 of the end cap 135 from exiting the channel 101.

The trolley 109 may comprise a metal plate body 108 defining a lower section having a carabiner and lanyard connection aperture 112 therethrough which extends through the gap 107. The body 108 may support a quadrant of main roller bearings 111 which bear upon the bearing surfaces 110, and constrain the main roller bearings 111 in the manner shown in FIG. 4 and the body 108 may also support and a pair of opposing upper roller bearings 113 which bear oppositely up against the upper surface 103 of the trolley channel 101, thereby preventing crabbing of the trolley.

The rail 100 may further comprise rail side sections 114 exteriorly adjacent to the trolley channel side sections 105. The rail side sections 114 also meet the rail bottom section 106.

The rail side sections 114 and the trolley channel side sections 105 may define side voids 115 therebetween. Self-tapping metal screw fasteners may pierce the rail side sections 114 but may stop short within the side voids 115, thereby avoiding penetration through into the trolley channel 101.

The rail side sections 114 may define parallel side surfaces of the rail 100.

The trolley channel side sections 105 may curve inwardly towards the bottom end thereof. Specifically, the trolley channel side sections 105 may comprise an upper straight portion and a lower inwardly angled straight portion. As shown in FIG. 4, the inward curvature of the trolley channel side sections 105 may laterally restrain the main roller bearings 111 (i.e., the width between the trolley channel side sections 105 at the bottom thereof may just accommodate the width across the bearings 111) so that the trolley 109 travels straight through the trolley channel 101 and gap 107.

As further shown in FIG. 2, the rail 100 preferably comprises a rectangular exterior cross-section. Further preferably, the rail 100 preferably comprises a square exterior cross-section.

With reference to FIG. 2, the rail 100 may further comprise a top attachment channel 122. Top and bottom interior surfaces of the side attachment channels 102 may lie either side of a lower surface 134 of the top attachment channel 122 along the vertical axis.

The side attachment channels 102 are preferably T-shaped in cross-section. Similarly, the top attachment channel 122 is preferably T-shaped in cross-section. The top attachment channel 122 may be wider than the side attachment channels 102.

The system further comprises a support which is used to engage the side attachment channels 102 to support the rail 100 from either side thereof.

With reference to FIGS. 5, 6, 9 and 10, narrow-headed T-shaped fasteners 116 may be inserted through respective slots 117 of the support 141 into the side attachment channels 102 and twist out of alignment therein to secure the support 141 against the sides of the rail 100. Locknuts 121 may tighten along threaded stems of the fasteners 116. Distal ends of the locknuts 121 may comprise markings for visually indicating the correct out of alignment locking of the locknuts 121.

Figure 5:
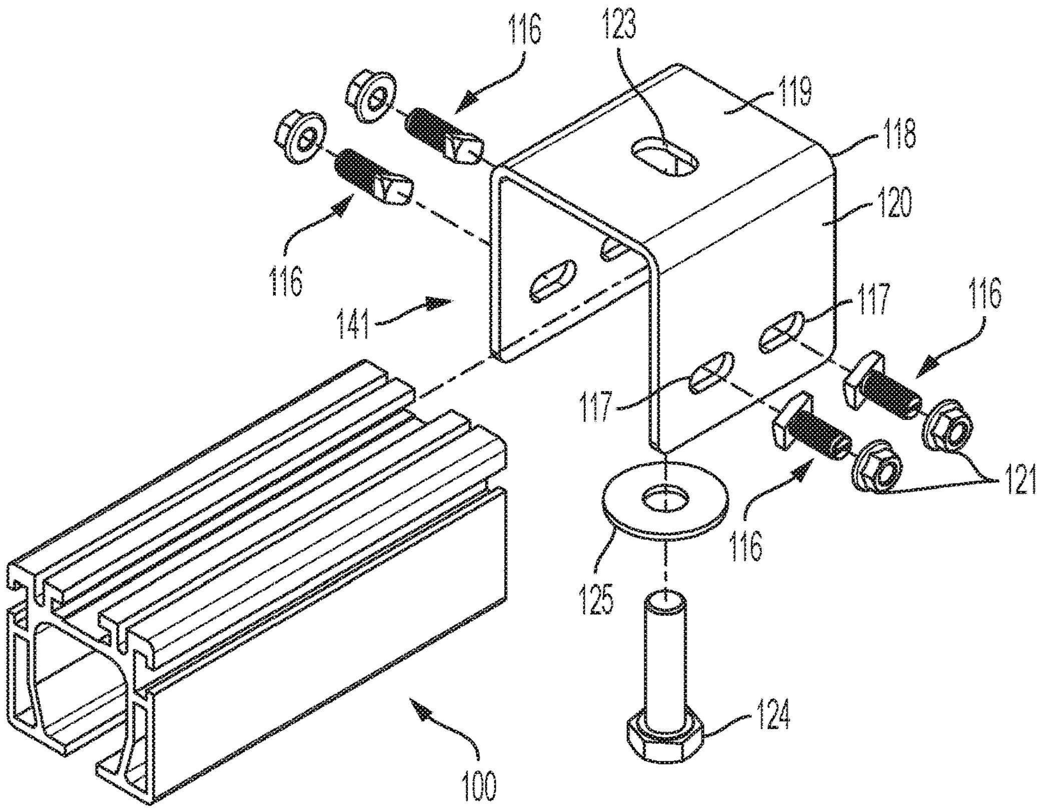
FIG. 5 shows a disassembled perspective view of a hanger channel bracket support and FIG. 6 shows a cross-sectional end view thereof.
Figure 6:
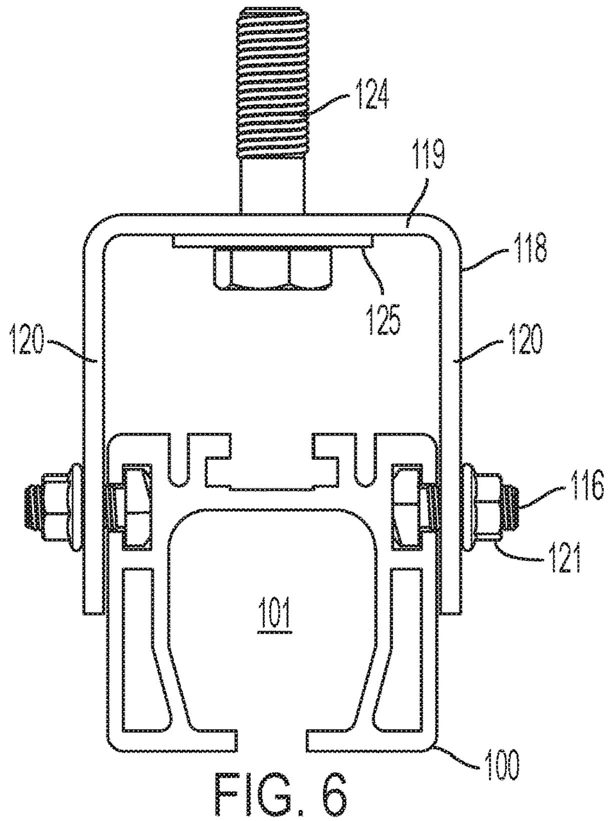

As shown in FIGS. 5 and 6, the support 141 may comprise a hanger channel bracket 118 having a web 119 and flanges 120 spaced apart so that the flanges 120 fit against the sides of the rail 100.

The flanges 120 may have slots 117 therethrough which collocate with the side attachment channels 102 and allow the T-shaped fasteners 116 to be inserted therethrough. In embodiments, the flanges 120 may have a plurality of pairs of slots 117 to allow for vertical offset adjustment between the hanger channel bracket 118 and the rail 100. The side attachment channels 102 may be towards an upper end of the rail 100 and the slot 117 of the support 141 may be towards a lower end of the flanges 120 so that the rail 100 may hang substantially beneath the support 141 in the manner shown in FIG. 6.

In embodiments, the rail 100 may be supported from the top attachment channel 122.

The web 119 may comprise an aperture or slot 123 for a suspension bolt 124 and washer 125 to be inserted therethrough.

Figure 7:
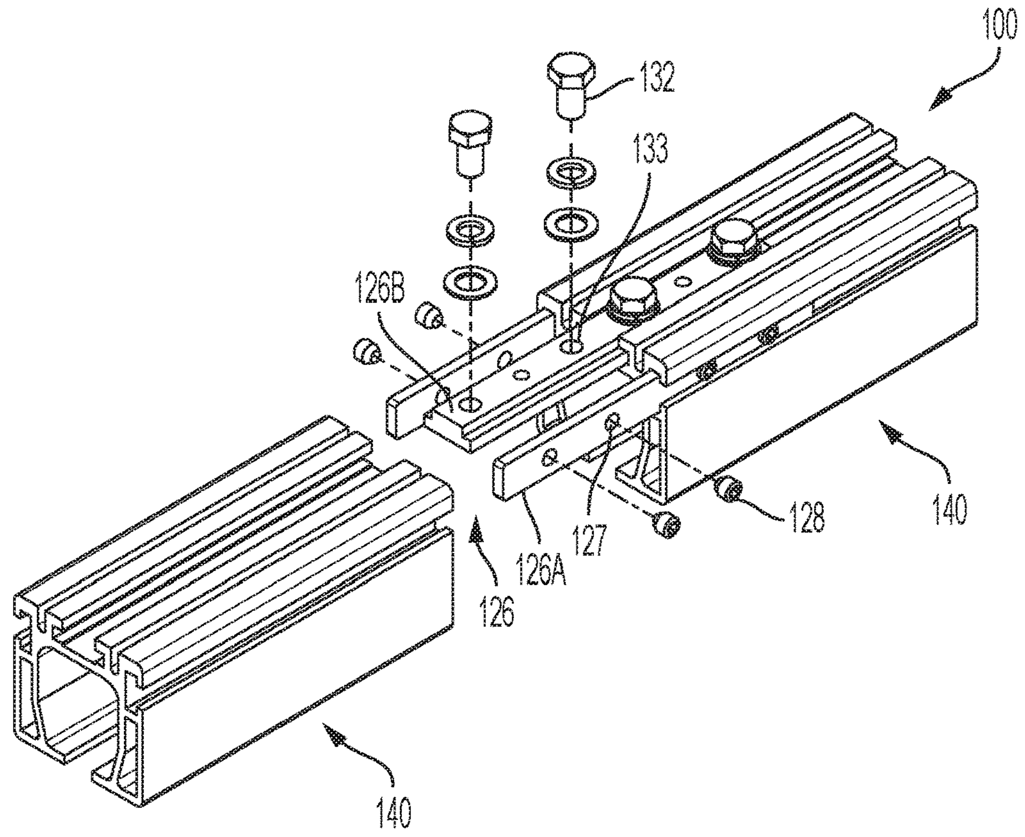
FIG. 7 shows a disassembled perspective view of splices joining the rail sections and FIG. 8 shows a cross-sectional end view thereof.

With reference to FIG. 7, the rail 100 may comprise rail sections 140 adjoined by splices 126.

Figure 8:
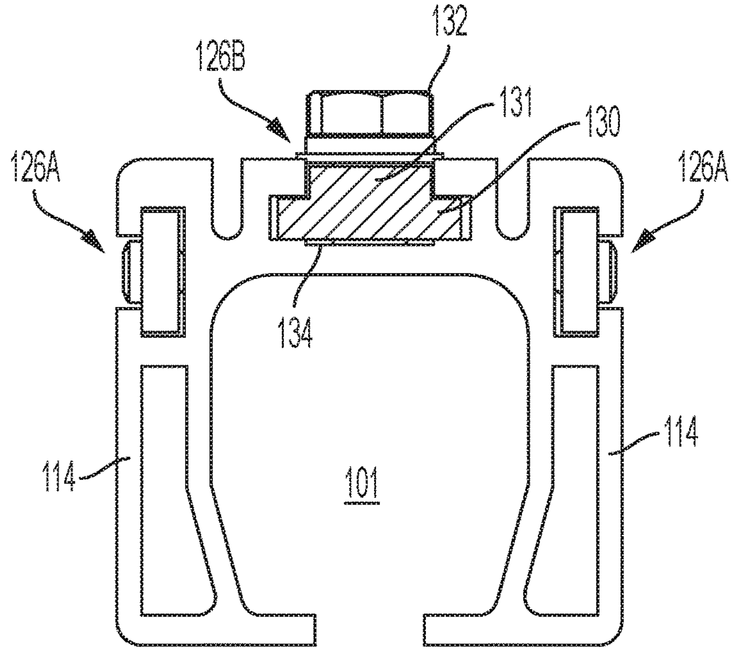
Figure 9:
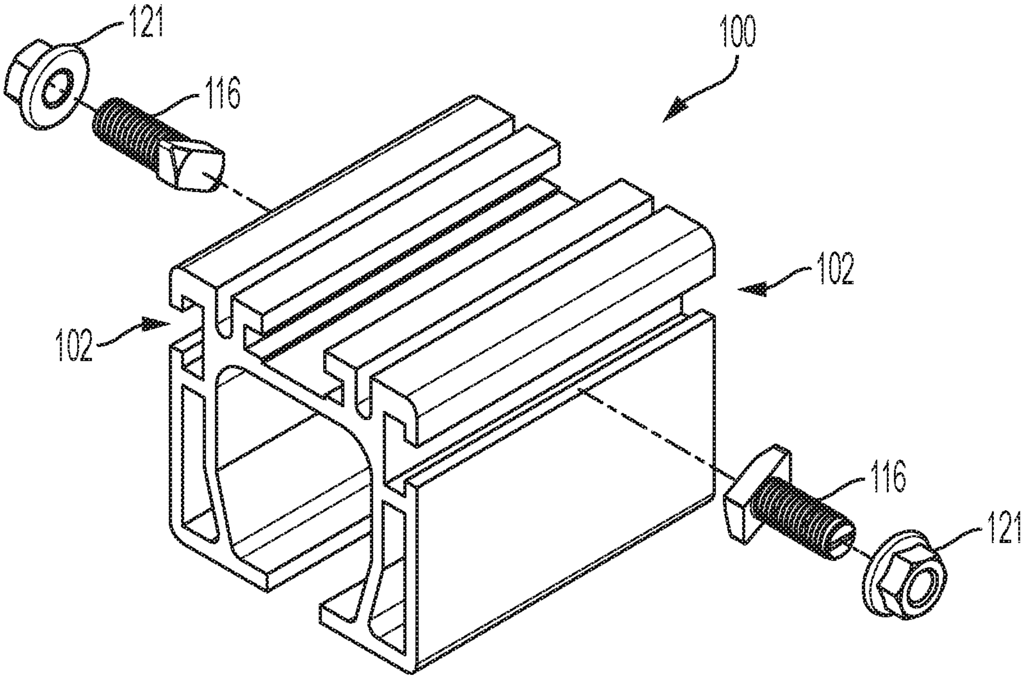
FIG. 9 shows a disassembled perspective view of narrow-headed T-shaped fasteners engaging side attachment channels of the rail and FIG. 10 shows a cross-sectional end view thereof.
Figure 10:
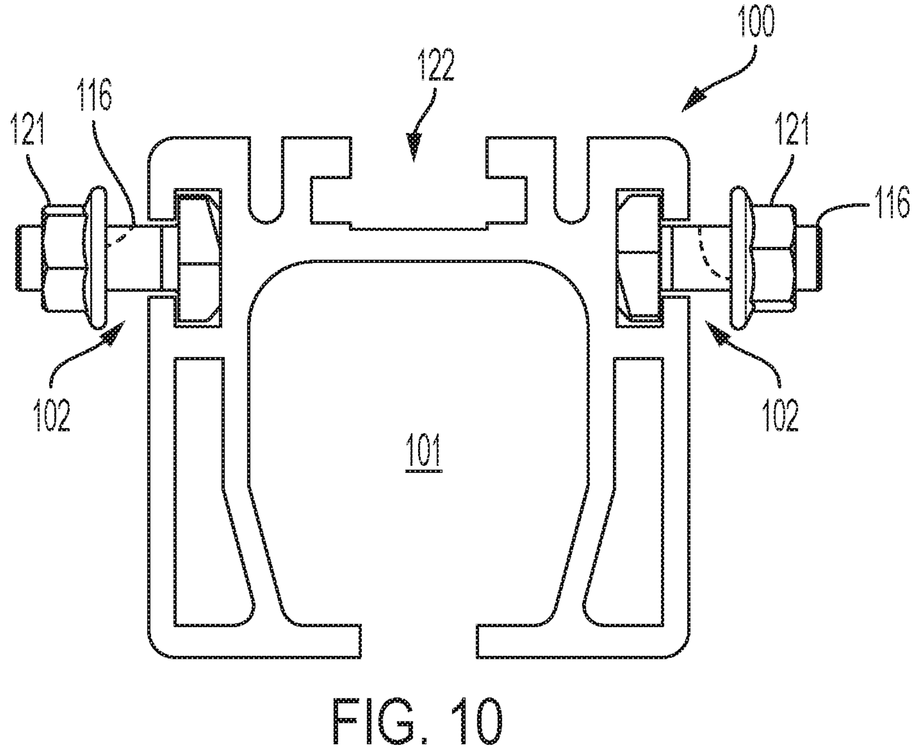

The splices 126 may comprise side splices 126A that fit within respective side attachment channels 102 of the rail sections 140. These side splices 126A may be straight and planar, and define a plurality of threaded apertures 127 therealong, through which screws 128 (preferably grub screws) tighten against an inner surface 129 of the side attachment channel 102, to tighten the side splice 126A against the cross-sectional edges. As illustrated in FIG. 8, the screws 128 preferably do not extend beyond exterior surfaces of the rail side sections 114, thereby not interfering with the hanger channel bracket 118.

The splices 126 may further comprise a top splice 126B. As alluded to above, the top attachment channel 122 may be wider than the side attachment channels 102, and therefore the top splice 126B may correspondingly be wider and have enhanced resilience capability.

Furthermore, the top splice 126B may comprise step-profiled sides 130 which engage under edge flanges of the top attachment channel 122. The top splice 126B may have a thicker mid-section 131 which may fit through the opening of the top attachment channel 122. Tension bolts 132 may engage through a plurality of threaded apertures 133 of the top splice 126B to bear against edge flanges of the top attachment channel 122.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A fall protection safety rail system comprising a rail defining:

a trolley channel therein;

side attachment channels, wherein the side attachment channels overlap with the trolley channel along a vertical axis but not along a horizontal axis; and a top attachment channel orientated orthogonally with respect to the side attachment channels; and wherein the system further comprises:

a support coupled to the side attachment channels to support the rail either side thereof.

2. The system as claimed in claim 1, wherein the rail comprises a width substantially the same as a height thereof.

3. The system as claimed in claim 1, wherein an exterior cross-section of the rail is square.

4. The system as claimed in claim 1, further comprising narrow-headed T-shaped fasteners and wherein the side attachment channels are T-shaped in cross-section so that the narrow-headed T-shaped fasteners can fit through slots of the support into the side attachment channels and twist out of alignment therein to secure the support against the rail.

5. The system as claimed in claim 4, wherein the support comprises a hanger channel bracket having a web and flanges spaced apart so that the flanges fit against sides of the rail and wherein the flanges have the slots therethrough which collocate with the side attachment channels so that the narrow-headed T-shaped fasteners can fit through the slots to engage into the side attachment channels.

6. The system as claimed in claim 5, wherein the side attachment channels are located at an upper end of the rail and wherein the slots are located at a lower end of the hanger channel bracket flanges.

7. The system as claimed in claim 1, further comprising splices and wherein the rail comprises rail sections and wherein the rail sections are adjoined by the splices extending therebetween and wherein the splices comprise a top splice which fits across top attachment channels of adjacent rail sections.

8. The system as claimed in claim 7, wherein the splices are straight and configured to slide longitudinally into respective top and sides attachment channels.

9. The system as claimed in claim 7, wherein the top splice comprises step-profiled sides which engage under edge flanges of the top attachment channels.

10. The system as claimed in claim 9, wherein the top splice has a thicker mid-section between the step-profiled sides, and wherein the thicker mid-section fits through an opening of the top attachment channel.

11. The system as claimed in claim 7, wherein the top splice comprises a plurality of threaded apertures through which tension bolts tighten to fix the top splice in the top attachment channel.

12. The system as claimed in claim 7, wherein the splices further comprise side splices which fit across respective side attachment channels of adjacent rail sections.

13. The system as claimed in claim 12, wherein the side splices are straight and planar.

14. The system as claimed in claim 12, further comprising screws and wherein the side splices comprise a plurality of threaded apertures therealong and wherein the screws tighten therethrough to fix the side splices in respective side channels.

15. The system as claimed in claim 14, wherein the screws do not extend beyond exterior surfaces of the rail sides when tightened.

16. The system as claimed in claim 12, wherein the top splice is wider than each of the side splices.

17. The system as claimed in claim 1, wherein top and bottom interior surfaces of the side attachment channels lie on either side of an upper surface of the trolley channel along the vertical axis.

18. The system as claimed in claim 1, wherein the rail comprises a trolley channel top section between trolley channel side sections, the trolley channel side sections meeting respective rail bottom sections, the rail bottom sections defining a gap therebetween and each defining a horizontal bearing surface within the channel for a trolley.

19. The system as claimed in claim 18, wherein the rail further comprises rail side sections exteriorly adjacent to the trolley channel side sections, the rail side sections meeting the rail bottom sections respectively and wherein the rail side sections and the trolley channel side sections define side voids therebetween.

20. The system as claimed in claim 19, wherein the rail side sections define parallel side surfaces.

21. The system as claimed in claim 18, wherein the trolley channel side sections curve inwardly towards bottom ends thereof.

22. The system as claimed in claim 21, wherein each trolley channel side sections comprises an upper vertical straight portion and a lower inwardly angled straight portion.

23. The system as claimed in claim 22, further comprising a trolley and wherein lower ends of the trolley channel sides define a width which constrains main roller bearings of the trolley therebetween.

24. The system as claimed in claim 22, wherein the trolley further comprises a pair of opposing upper roller bearings locating up against the upper surface of the trolley channel.

25. The system as claimed in claim 1, further comprising an end cap terminating the rail.

26. The system as claimed in claim 25, wherein the end cap comprises a web and side flanges.

27. The system as claimed in claim 26, wherein fasteners insert through corresponding apertures of the side flanges and through corresponding apertures of the rail.

28. A method of operating a fall protection safety rail system, the method comprising:

providing the fall protection safety rail system of claim 1; and securing a person from a trolley within the rail using a safety harness and lanyard.

* * * * *